United States Patent [19]

Haas, Sr. et al.

[11] Patent Number: 5,201,403
[45] Date of Patent: Apr. 13, 1993

[54] INTERSTAGE WAFER BLOCK ACCUMULATION

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 830,800

[22] Filed: Feb. 6, 1992

Related U.S. Application Data

[63] Continuation of Ser. No. 513,909, Apr. 24, 1990, abandoned.

[30] Foreign Application Priority Data

Apr. 28, 1989 [AT] Austria .................................. 1029/89

[51] Int. Cl.$^5$ ............................................ B65G 43/10
[52] U.S. Cl. .................................. 198/575; 198/347.1; 198/580; 414/793.1
[58] Field of Search .................. 198/347.1, 347.4, 460, 198/468.8, 580, 575, 576; 414/788.7, 791.1, 793.1

[56] References Cited

U.S. PATENT DOCUMENTS

| | | | |
|---|---|---|---|
| 3,153,487 | 10/1964 | Hoellen | 198/347.4 |
| 3,604,551 | 9/1971 | Fink | 198/347.1 X |
| 3,734,267 | 5/1973 | Tice | 198/347.1 |
| 4,229,137 | 10/1980 | Molins | 198/347.1 X |
| 4,502,587 | 3/1985 | Clark | 198/347.1 |
| 4,610,886 | 9/1986 | Buller-Colthurst | 198/575 X |
| 4,717,013 | 1/1988 | Reissmann et al. | 198/460 X |
| 4,871,057 | 10/1989 | Aarts | 198/347.1 X |
| 4,962,844 | 10/1990 | Francioni | 198/575 X |
| 5,058,727 | 10/1991 | Jahns et al. | 198/575 X |

FOREIGN PATENT DOCUMENTS

| | | | |
|---|---|---|---|
| 0136070 | 10/1979 | Japan | 198/460 |
| 0149220 | 8/1984 | Japan | 198/460 |
| 0047775 | 3/1985 | Japan | 198/347.1 |
| 0114907 | 6/1986 | Japan | 198/347.4 |
| 0153016 | 7/1987 | Japan | 198/575 |
| 0157123 | 7/1987 | Japan | 198/347.1 |
| 1502440 | 8/1989 | U.S.S.R. | 198/575 |
| 2189760 | 11/1987 | United Kingdom | 198/460 |

Primary Examiner—Robert P. Olszewski
Assistant Examiner—James R. Bidwell
Attorney, Agent, or Firm—Collard & Roe

[57] ABSTRACT

An interstage wafer block accumulator for a plant for the production and further processing of wafer blocks. In an interstage wafer block accumulator comprising at least one conveyor and a plurality of accumulator units, each of which accommodates one or more wafer blocks and is disposed between a feed station and a delivery station, it is proposed that said accumulator units for the wafer blocks accommodated in each accumulator unit should be consecutively arranged in the direction of travel of the wafer blocks. Each of said accumulator units comprises a separate horizontal conveyor for accommodating and forwarding wafer block stacks, each of which comprises one wafer block or a plurality of superimposed wafer block stacks. The interstage wafer block accumulator may have a plurality of superimposed storage levels. The accumulator units may be consecutively arranged on said plurality of storage levels in the direction of travel of the wafer blocks. In the interstage wafer block accumulator the accumulators may be arranged on one level or on each of a plurality of superimposed storage levels in a plurality of routes, which adjoin at an angle or are parallel to each other.

11 Claims, 3 Drawing Sheets

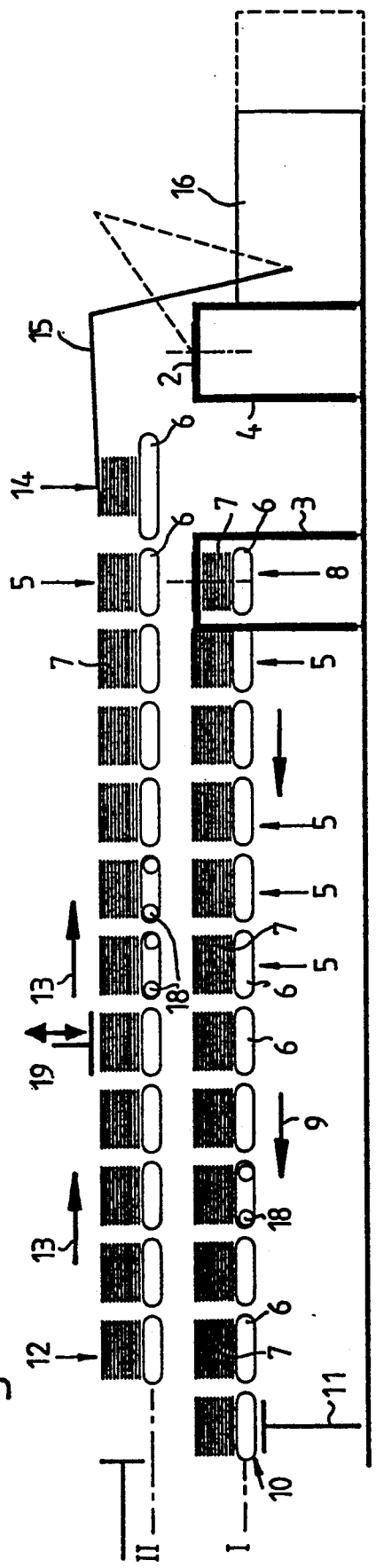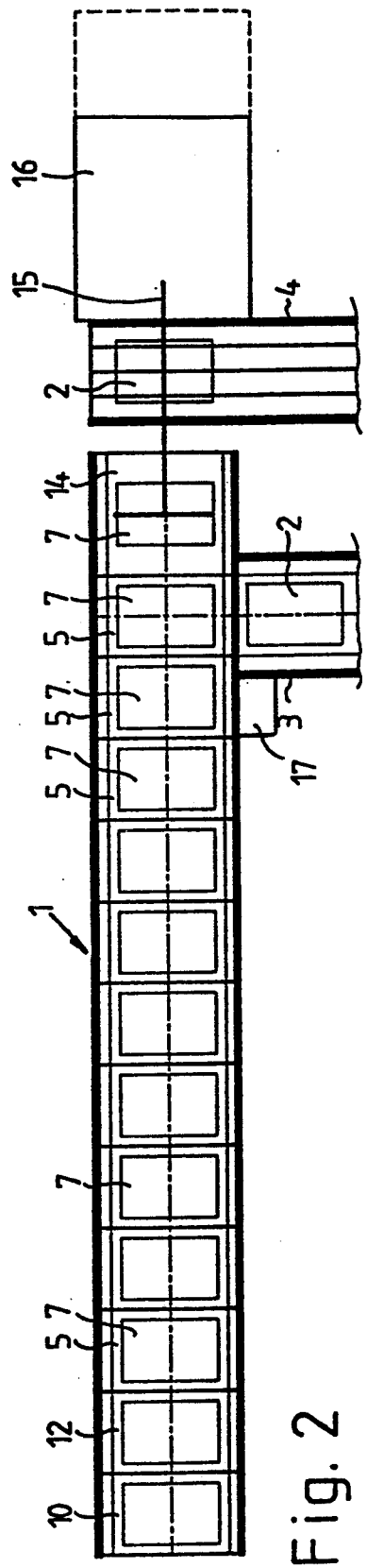

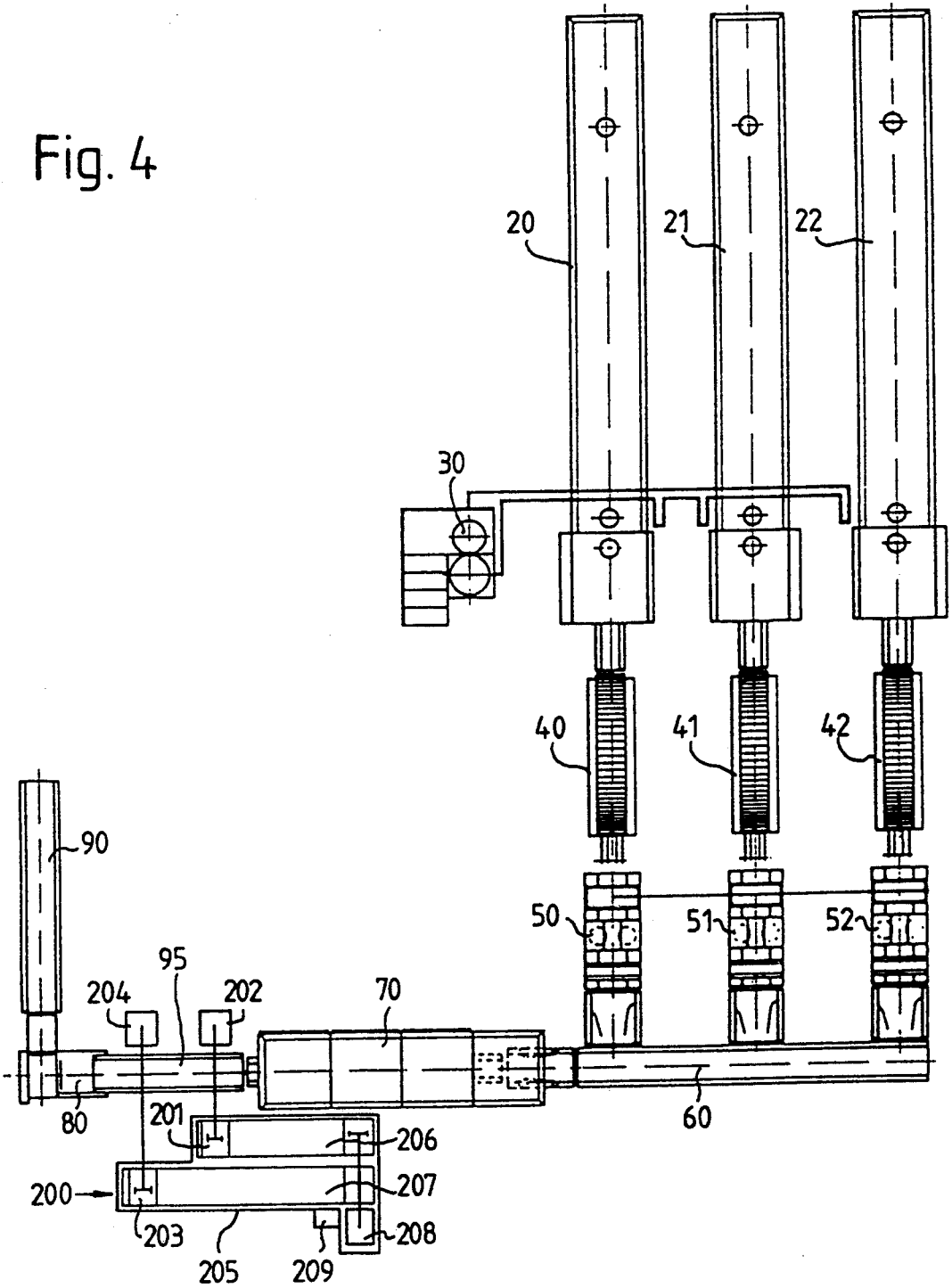

INTERSTAGE WAFER BLOCK ACCUMULATION

CROSS-REFERENCE TO RELATED APPLICATION

This is a continuation of our copending U.S. patent application Ser. No. 07/513,909, filed Apr. 24, 1990, now abandoned.

BACKGROUND OF THE INVENTION

1. Field of the Invention

This invention relates to the interstage storage of wafer blocks in plants for producing and processing wafer blocks.

2. Description of the Prior Art

Wafer blocks, sometimes called sweets blocks, are an intermediate product formed in the wafer or sweets industry. That intermediate product is made from fragile, crisp, brittle rectangular wafer sheets having a maximum moisture content of 1 to 4%, and in dependence on the production line is processed to form widely different wafer products or wafer-filled products.

The wafer sheets which are processed to form wafer blocks belong to the wafers of that kind which when they are still warm in an as-baked state and when they have been cooled to room temperature are crisp, brittle and fragile and which in the end product have a maximum moisture content of 1 to 4%. Examples of such fragile, brittle wafers made on an industrial scale are rectangular wafer sheets but also round wafer sheets, oblatelike wafers and other so-called flat wafers, also wafer plates, which in the wafer and sweets industries are described as low hollow wafers and consist of halves of hollow bodies, which halves are joined by flat webs to form large wafer plates and comprise nutlike, egglike, acornlike, cubelike and cylindrical shapes and the like, and cast hollow wafers, such as wafer cones, cast wafer cups, cast wafer figures and the like.

A difference must be made between such wafers and those which are made in the wafer industry and owing to their high sugar content (up to 35%), are plastically deformable in an as-baked or warm state and only after they have been cooled have a fragile, crisp, brittle consistency and in the end product have a moisture content up to 1 to 4%. Examples of said wafers made on an industrial scale are rolled wafer cones and wafer rolls, which are formed in that individual flat wafers or flat wafer cakes are rolled up in a warm, plastically deformable state and are then permitted to cool, or hollow rods or wafer rolls, which are made in that an endless, baked, thin wafer strip is helically wound in a plastically shapable state with overlapping convolutions on a cylindrical mandrel to form a tube, which is then cut to length and permitted to cool.

Wafers of another kind have as an end product a moisture content in excess of 8% and are baked from a wafer dough having a high egg content (10 to 50%) and are soft and elastic in an as-baked state and when they have been cooled to room temperature.

In the wafer industry the wafers of said kinds are produced and processed further in substantially automatic production lines, which in most cases are specialized for a single end product. In such a production line, which comprises an integrated plant for the production and further processing of wafer blocks, e.g., liquid wafer dough may be baked in a fully automatic baking machine, in most cases described as a wafer baking oven, to form large thin, rectangular brittle wafer sheets. The wafer sheets are taken from the wafer baking oven, cooled in a wafer sheet cooler and transported to a wafer sheet coating machine, in which they are coated with a whipped fat cream and are stacked to form cream-filled wafer blocks. The wafer blocks are subsequently cooled so that the cream is consolidated and the cohesion in each block is increased. The wafer blocks which have left the wafer block cooler are delivered to a wafer block cutting apparatus and are cut therein in two mutually orthogonal directions into parallelepipedic cream-filled wafers, which have the same size and are described as wafer bars or Neapolitan bars, and are subsequently airtightly packaged in packages of uniform size, e.g., 10 pieces per package.

Other production lines of the wafer industry are used to bake large rectangular (350 mm×750 mm) wafer sheets in automatic wafer baking ovens and in wafer-sheet coating machines are processed to form cream-filled wafer blocks as an intermediate product. Said wafer blocks are cut in wafer block cutting apparatuses into small parallelepipedic wafer pieces or wafer bars or wafers having the same size, which in a succeeding part of the production line are coated with chocolate or another coating composition and are subsequently packaged in packages of the same size.

In a production line designed for the production of chocolate bars filled with wafers or with wafer bars, large rectangular (350 mm×750 mm) wafer sheets are baked in an automatic wafer baking oven and in wafer sheet coating machines are processed to form an intermediate product consisting of cream-filled wafer blocks, which in wafer block cutting apparatuses are cut into small parallelepipedic wafer pieces or wafer bars or wafers and in a succeeding bar-forming plant are placed into molds for casting bars of chocolate and are thus integrated in the bars of chocolate to make bars of chocolate filled with wafers or wafer bars.

The wafer baking ovens or automatic wafer baking ovens which are arranged at the upstream end of such production lines or of those plant parts which serve for the production and further processing of wafer blocks include a multiplicity of identical wafer baking molds, which are arranged in respective baking tongs and provided each with two rectangular baking plates. Said modes are arranged in the wafer baking oven in a row, e.g., as an endless chain, and revolve in the wafer baking oven from a dough pouring station, in which liquid wafer dough is poured into the bottom baking plates of the opened baking tongs, through the baking space, in which the wafer sheets are baked in the closed baking tongs, to the wafer taking station, in which the wafer sheets are taken from the wafer baking oven. When the wafer baking oven has been started the chain of baking tongs revolves in an empty state and the oven is heated to the desired operating or baking temperature. Only when that temperature has been reached are the supply of dough to the dough pouring station and the pouring of wafer dough initiated. A wafer baking oven may comprise a chain of, e.g., 80 baking tongs and may be operated to bake each wafer sheet for 2 minutes. When the wafer baking oven is shut down, the supply of dough is first shut off and the chain of baking tongs is revolved further until the dough which has been poured for the last wafer sheet has completely been baked and has emerged in the wafer taking station. This means that a total of about 75 wafer sheets are baked after the supply of dough has been shut off. In the wafer sheet coating machine, 25 wafer blocks are made from said 75 wafer sheets. Each of said blocks consists of three wafer sheets and two layers of cream. Said wafer blocks must then be processed further in those plant parts of the production line which succeed the wafer sheet coating machine. When the wafer baking oven has been restarted and the baking temperature has again been reached and the supply of dough has again been initiated it will take about 2 minutes before the first completely baked wafer sheet can emerge from the wafer baking oven.

If the production must be interrupted for a relatively long time, e.g., for maintenance work or for an alteration of individual parts of the plant, it will be necessary to continue the operation of the wafer baking oven between the shut-off of the supply of dough and the re-initiation of the supply of dough and the oven must be kept at the operating or baking temperature during that time because otherwise the downtime will be prolonged by the time required to reheat the wafer baking oven. For this reason it has been usual to perform maintenance work or to effect alterations affecting those plant parts of the production line which succeed the wafer baking oven as far as possible during those times in which the production line is shut down for other reasons, e.g., in the evening hours after the end of production or during the weekend.

In order to minimize the loss of production which will result in a production line when a broken cutting wire of a wafer block cutting apparatus must be replaced or when the packaging film must be renewed or replaced in a wafer bar packaging machine, it is known to provide a wafer block accumulator, which is disposed between the wafer block cooling apparatus, which succeeds the wafer sheet coating machine, and those plant parts of the production line which succeed the wafer block cooling apparatus. When the wafer baking oven has been shut down such accumulator will permit an operation of those plant parts of the production plant which precede the wafer block cooling apparatus until such plant parts are empty. This is possible because the accumulator will receive the wafer blocks which have been formed and emerge from the wafer block cooling apparatus until said plant parts are empty.

In a known wafer block accumulator, a plurality of conveyor belts or storage belts are arranged one over the other and individual wafer blocks are stored in a row on said belts. Pivoted feed and delivery belts are provided, which in dependence on their angular position may serve any of the conveyor belts and serve to convey the wafer blocks to and from the storage belts. Because the pivotal movement of said feed and discharge belts must closely be limited owing to the low adhesion of the underside of each wafer block, an increase of the capacity can be achieved only in that the length of the storage belts and, as a result, the overall length of the entire wafer block accumulator, are increased.

SUMMARY OF THE INVENTION

It is an object of the invention to provide a new wafer block accumulator, which is highly compact and permits a simple adaptation of its capacity to various conditions, such as the length of the time for which the production may be interrupted and which is to be bridged, or the space which is available for installations, and the like.

In an interstage wafer block accumulator comprising at least one conveyor and a plurality of accumulator units, each of which receives one or more wafer blocks and which are provided between a feed station and a delivery station, this is accomplished in accordance with the invention in that the accumulator units for the wafer blocks received by the respective accumulator unit are consecutively arranged in the direction of travel of the wafer blocks and each accumulator unit comprises a separate horizontal conveyor for receiving and delivering wafer block stacks, each of which consists of one wafer block or a plurality of superimposed wafer blocks.

That design permits the storage capacity to be changed in a very simple manner by a change of the number of wafer blocks which are superimposed in each wafer block stack. Because the accumulator units are independent of each other, the interstage accumulator can be adapted to almost any space condition.

In accordance with a further feature of the invention the feed station and/or the delivery station is integrated in an associated one of the accumulator units. This will be of advantage particularly if an automatic manipulator for feeding or taking the wafer blocks is associated with the feed station or the delivery station and used to feed or take stacks of wafer blocks into and from the interstage accumulator. Alternatively, each automatic manipulator may be used to stack or to single the wafer blocks and stacking and singling may be effected in the associated accumulator units by means of the integrated feed or delivery station.

Instead of providing automatic manipulators for the feed and delivery stations, which are integrated in associated accumulator units, it is possible to provide a separate feed unit, in which wafer blocks are stacked, and a separate delivery unit, in which the wafer blocks of the wafer block stacks are singled.

To provide an accumulator having a higher capacity and designed for a storage on a plurality of superimposed storage levels, it is proposed in accordance with the invention that the accumulator units are consecutively arranged on said storage levels in the direction of travel of the wafer blocks and a vertical elevator is provided for transporting the wafer block stacks from one level to another and preferably for lifting and lowering an entire accumulator unit from one storage level to another. That design will ensure that each wafer block stack will be forwarded in the interstage accumulator by the horizontal conveyors of the accumulator units in the direction of travel of the wafer blocks in the interstage accumulator, which horizontal conveyors are designed to convey the wafer block stacks.

In accordance with a further feature of the invention the accumulator units may be arranged on a single level or on a plurality of superimposed storage levels and may be arranged on said level or on each of said levels in a plurality of adjoining routes, which extend at an angle to each other, and a transfer device may be provided between the last accumulator unit of a given route and the first accumulator unit of the next succeeding route and may serve to transfer the wafer block stacks in the proper orientation from one route to the other. That design will permit a highly variable adaptation of the interstage wafer block accumulator to confined spaces for installation when an existing wafer production line is subsequently to be provided with an interstage accumulator in accordance with the invention. The transfer apparatus for transferring the wafer block stacks in the proper orientation from one route of the interstage accumulator to the next may consist of known curved belts and in an interstage accumulator having only a single storage level, the accumulator units may be arranged on one level, e.g., in a plurality of routes or interstage accumulator parts, which routes or parts adjoin at right angles to each other. This will permit the feed station and delivery station to be arranged very close to each other.

In an embodiment of the interstage accumulator in which the accumulator units are arranged on a single level in routes which adjoin at right angles to each other, a separate transfer apparatus for the wafer block stacks may not be required at the junction between two consecutive routes and may be replaced by an accumulator unit which is provided with a conveyor which is adapted to move the wafer block stacks in two mutually orthogonal directions as the wafer block stacks are received and delivered. Such a conveyor may be similar in design to a deflector for use with belt conveyors for wafer blocks, which deflector is known from German Patent Specification 3,208,801.

Another embodiment of the interstage wafer block accumulator in accordance with the invention comprises mutually independent accumulator elements, which are arranged on two or more superimposed storage levels and it is also possible to provide a plurality of accumulator parts which extend at an angle or at right angles to each other so that the accumulator units provided with the feed station and with the delivery station are as close as possible to each other. Automatic manipulators may be provided at the junctions between said parts of such interstage accumulator and may serve those accumulator units which are arranged at said junctions and are included in routes which are superimposed in each part. For instance, an automatic manipulator which is arranged at a junction may transfer the wafer block stacks from one route to the next on both superimposed storage levels.

In an embodiment of the interstage wafer block accumulator comprising two parallel routes arranged on superimposed storage levels, an automatic manipulator may be constituted by a vertical elevator for transferring the wafer block stacks from one storage level to the other.

Another illustrative embodiment of an interstage wafer block accumulator may comprise four parallel routes, which include accumulator units and are arranged on two superimposed storage levels and those accumulator units which are arranged at the ends of the routes may be directly juxtaposed or superimposed. In that embodiment, two automatic manipulators may be provided, each of which is arranged at one end of the interstage accumulator and serves to transfer the wafer block stacks on a storage level and from one storage level to the other. The automatic manipulator which is provided at the feed and delivery end of the interstage accumulator may be used also to form and disintegrate the wafer block stacks in the feed station, which is provided on the lower storage level, and in the delivery station, which is provided on the upper storage level. In that case there will be no need in such an interstage wafer block accumulator for a separate wafer block stacker at the feed station and for separate vertical elevators for transferring the wafer block stacks from one storage level to the other, or for a separate apparatus for singling the wafer blocks at the delivery station.

The means for driving the horizontal conveyors of immediately succeeding accumulator units may be operatively interconnected, provided that each accumulator unit and specifically its horizontal conveyor is adapted to be coupled or uncoupled by clutches or the like. But it will be preferred in accordance with the invention to provide each horizontal conveyor of the accumulator units with a separate drive motor, which is adapted to be controlled by the control means of the interstage accumulator.

In accordance with a further feature of the invention the accumulator units which are consecutively arranged between the feed station and the delivery station or in each route consist of interchangeable modules. This will permit an economical manufacture of interstage accumulators which differ in size and which differ only in the number of interchangeable and preferably identical accumulator units.

In accordance with a further feature of the invention a heat-insulating enclosure is provided for each accumulator unit or for the entire interstage accumulator. Besides, the accumulator elements may be arranged within a common enclosure, in which predetermined temperature and humidity values are maintained in the air. This will be particularly desirable for interstage wafer block accumulators which have a high storage capacity and are designed to allow for relatively long downtimes.

In accordance with a further feature of the invention at least one of the accumulator units comprises an apparatus for compressing each wafer block stack as it lies on the horizontal conveyor of that accumulator unit. With that design, the internal cohesion of the wafer blocks can be ensured in interstage accumulators having a very high storage capacity.

The design of a wafer block accumulator in accordance with the invention permits an accommodation of very high storage capacities within a very small space and the accumulator may be designed for such a storage capacity that maintenance work can be effected, worn parts can be replaced or faults can be eliminated within a short downtime in the plant parts which succeed the wafer block accumulator and this will not require a shutdown of those parts of the production line which precede the wafer block accumulator. Such downtimes for which the storage capacity of the wafer block accumulator may be selected may be required for renewal or replacement of the packaging film in the packaging machine, for adjusting or maintenance work for optimizing the packaging of the wafer bars or the like, for a replacement of the cutter frames in the wafer block cutting apparatus and the like.

BRIEF DESCRIPTION OF THE DRAWING

Further objects and advantages of the invention will become apparent from the following detailed description with reference to the accompanying drawing showing a plurality of embodiments of the present invention.

In the drawings, identical reference characters in the several views designate the same parts.

FIG. 1 is a diagrammatic side elevation showing a first embodiment of an interstage accumulator in accordance with the invention.

FIG. 2 is a diagrammatic top plan view showing the interstage accumulator of FIG. 1.

FIG. 4 is a diagrammatic view showing a plant which serves for the production and further processing of wafer blocks and includes a further embodiment of an interstage accumulator in accordance with the invention.

DETAILED DESCRIPTION OF THE PREFERRED EMBODIMENTS

Figure 3:
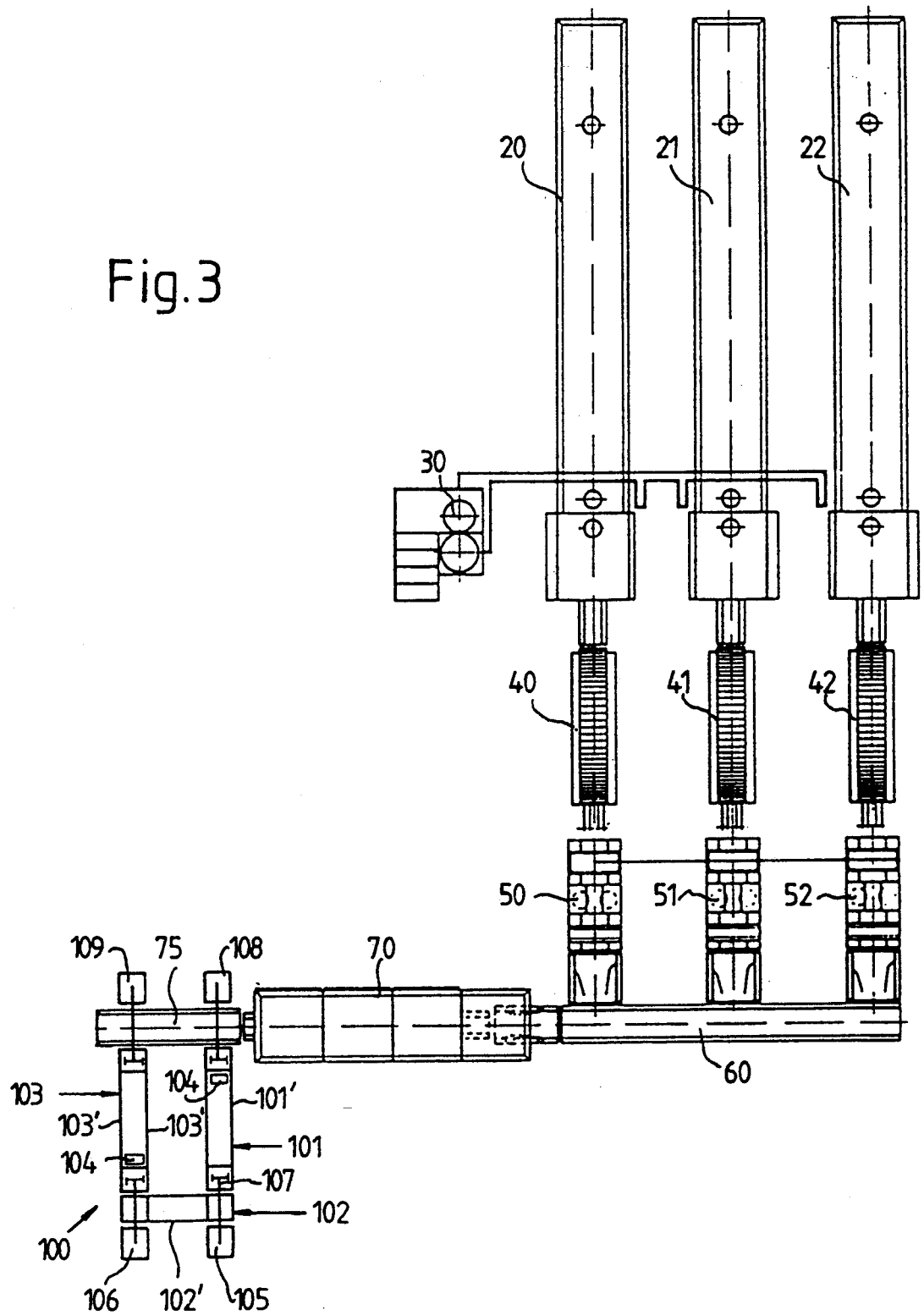
FIG. 3 is a diagrammatic representation showing a part of a plant which serves for the production and further processing of cream-filled wafer blocks and comprises another embodiment of the interstage accumulator in accordance with the invention.

In the illustrative embodiment shown in FIGS. 1 and 2 the interstage wafer block accumulator 1 is arranged between a belt conveyor 3, which conveys the wafer blocks 2 from the wafer block cooling apparatus, not shown, to the interstage wafer block accumulator 1, and a multiple belt conveyor 4, which leads to a wafer block cutting apparatus, not shown.

The interstage accumulator 1 consists of separate, mutually independent accumulator units 5, which are arranged in a frame, which is not shown for the sake of clearness and in which the accumulator units are arranged in two superimposed routes arranged on two superimposed, substantially horizontal storage levels I, II. Each accumulator unit 5 is provided with a horizontal conveyor 6, which is anchored in the frame and consists, e.g., of a belt conveyor or multiple-belt conveyor and supports each wafer block stack 7 which has been received by the accumulator unit. Consecutive accumulator units 5 adjoin each other so that the wafer block stacks can safely be transferred from one accumulator unit 5 to the next by the horizontal conveyors 6 and additional means are not required for that purpose. Coming from the belt conveyor 3 the wafer blocks 2 are fed at the front end of the interstage accumulator 1 into the first accumulator unit 8 on the lower storage level I and are stacked there and are forwarded as a wafer block stack 7 from accumulator unit 5 to accumulator unit 5 in the direction indicated by the arrow 9 as far as to the last accumulator unit 10 on the lower storage level I at the rear end of the interstage accumulator 1. A vertical elevator 11, which is only symbolized by a ram, is provided in the frame at the rear end of the interstage accumulator 1 and lifts the last accumulator unit 10 on the lower storage level I together with the wafer block stack 7 included in that accumulator unit 10 to the upper storage level II and lowers the storage unit 10 to the lower storage level I when the wafer block stack has been transferred to the first storage unit 12 on the upper storage level. On the upper storage level II, the wafer block stacks 7 are forwarded from the first accumulator unit 12 on the upper storage level II in the direction indicated by the arrow 13 from accumulator unit 5 to accumulator unit 5 as far as to the last accumulator unit 14 on the upper storage level II. In that last accumulator unit 14, each wafer block is engaged by an arm 15 of an automatic manipulator 16, which is only diagrammatically indicated, and is transferred to the multiple-belt conveyor 4.

During the normal production in the production line, a stack of wafer blocks is formed in the first accumulator unit 8 and that wafer block stack 7 is then directly transported to the last accumulator unit 14 and is singled there and is not stored in any of the accumulator units 5.

If the production is to be interrupted in the production line in a part thereof which succeeds the interstage accumulator 1, for instance, because the paper or the packaging film is to be replaced in the packaging machine at the downstream end of the production line, it will not be necessary to interrupt the supply of dough to the wafer baking oven at the upstream end of the production line. Such an interruption will not be necessary because those wafer blocks 2 which will arrive at the interstage accumulator 1 during the replacement of the packaging film will be stacked in the first accumulator unit 8 on the lower storage level I and will be stored in the interstage accumulator 1 in its accumulator units 5 disposed between the first accumulator unit 8 and the last accumulator unit 14. The number of wafer blocks 2 per wafer block stack 7 and the height of the wafer block stack will always be selected to ensure a utilization of the maximum storage capacity of the accumulator unit 8.

In the upstream accumulator unit 8 of the lower storage level I, stacks may be formed by means of a chute, which is integrated in said accumulator unit 8 and ensures a gentle descent of the wafer blocks 2 from the conveying level of the belt conveyor 3 to the lower storage level I, which is below that conveying level.

In a different embodiment of the interstage accumulator the stacks may be formed in the upstream accumulator unit on the lower storage level by an automatic manipulator, which is associated with the first accumulator unit.

In the embodiment illustrated by way of example in FIGS. 1 and 2 the automatic manipulator 16 may so be controlled that the manipulator 16 will directly transfer each wafer block 2 from the belt conveyor 3 to the multiple-belt conveyor 4 during the normal production and only in case of an interruption of the production in those plant parts of the production line which succeed the interstage accumulator 1 will begin to stack the wafer blocks on the horizontal conveyor 6 of the upstream accumulator unit 8 on the lower storage level I.

Owing to the provision of the wafer block accumulator in accordance with the invention those plant parts of the production line which precede the wafer block accumulator and those which succeed said accumulator may be operated at different working speeds for a short time, e.g., when it is desired to empty the wafer block accumulator after an interruption of the production in the succeeding part of the production line without a need for a removal of wafer blocks from the production line. In that case it will be ensured that the first wafer block stack which has been received by or formed in the wafer block accumulator will also be the first wafer block stack which is delivered and subjected to further processing. In that case there will be no significant differences between the residence times of the wafer blocks in the wafer block accumulator, which differences might affect the quality of the product made from the wafer blocks. There will be differences between the residence times only within a wafer block stack and such differences will be due to the stacking operation by which the wafer block stack is formed and to the unstacking operation by which the wafer blocks of the wafer block stack are singled.

FIGS. 3 and 4 show production lines for making Neapolitan wafer bars. That production line comprises three fully automatic wafer baking ovens 20, 21, 22, in which liquid wafer dough supplied from a common dough-preparing station 30 is baked to produce large rectangular wafer sheets. The wafer sheets which have emerged from each baking oven 20, 21 or 22 are cooled in an associated wafer sheet cooler 40, 41 or 42 and are then delivered to an associated automatic wafer sheet coating machine 50, 51 or 52. In said coating machine the wafer sheets are coated with cream and are assembled to form cream-filled multilayer wafer blocks. The coating machines 50, 51, 52 deliver the wafer blocks to a collecting belt conveyor 60, by which the wafer blocks are forwarded to a wafer block cooling apparatus 70. As is shown only in FIG. 4, the wafer blocks which have passed through the cooling apparatus 70 are cut in a wafer block cutting apparatus 80 into individual wafer bars, which are equal in size and are subsequently airtightly packaged in a packaging apparatus 90 to In the embodiment shown in FIG. 3, wafer block cooling apparatus is succeeded by a belt conveyor 75, which extends across an interstage wafer block accumulator 100 consisting of three accumulator sections 101, 102, 103, in which the accumulator units 104 are consecutively arranged in the direction of travel of the wafer blocks in routes which adjoin at right angles to each other. The accumulator units 104 of each route constitute a set of accumulator units which are aligned on a straight line. At each junction between adjacent sets of accumulators or between adjacent accumulator sections 101, 102, 103, a transfer apparatus 105 or 106 is arranged, which may consist, e.g., of an automatic manipulator, which comprises an arm 107 for transferring wafer blocks from the last accumulator unit of a preceding accumulator section 101 or 102 to the first accumulator unit of a succeeding accumulator section 102 or 103. The accumulator units 104 of each of the three accumulator sections 101, 102, 103 are enclosed in a heat-insulating enclosure 101', 102', 103'. Automatic manipulators 108 and 109 are provided for feeding wafer blocks into the first accumulator section 101 and for delivering wafer blocks from the last accumulator section 103.

In accordance with FIG. 4 a belt conveyor 95 succeeding the wafer block cooling apparatus 70 extends near another embodiment of an interstage accumulator 200 in accordance with the invention. An automatic manipulator 202 is associated with the feed station 201 of the interstage accumulator 200 and serves to feed the wafer blocks from the belt conveyor 95 into the interstage accumulator 200. An automatic manipulator 204 is associated with the delivery station 203 of the interstage accumulator 203 and serves to return the wafer blocks from the interstage accumulator 200 to the belt conveyor 75. The interstage accumulator 200 comprises two accumulator sections 206, 207, which are accommodated in a common enclosure 205 and comprise accumulator units, which are arranged on one level in two parallel routes and in each route constitute a set of accumulator units which are aligned along a straight line. The enclosure 205 encloses a space in which the humidity and temperature of the air are controlled and which contains an automatic manipulator 208, which transfers the wafer blocks from the last accumulator unit of the first accumulator section 206 to the first accumulator unit of the second accumulator section 207. A control unit 209 for controlling the accumulator units and specifically their horizontal conveyors and for controlling the automatic manipulators 202, 204, 208 is mounted on the enclosure 205. Such a control unit 17 is also provided in that embodiment of an interstage accumulator in accordance with the invention which is shown in FIGS. 1 and 2. That control unit 17 is operatively connected to the drive motors 18 of the horizontal conveyors 6 of the several accumulator units 5. The drive motors 18 consist of drum motors and are accommodated in the drums around which the belt conveyors or multiple-belt conveyors are trained.

In accordance with the invention at least one of the accumulator units may comprise a device for compressing each wafer block stack when it lies on the horizontal conveyor of that accumulator unit. Such a device is diagrammatically indicated in FIG. 1 at 19.

What we claim is:

1. An apparatus for the interstage accumulation of wafer blocks in a plurality of successively arranged, independent and like accumulator units, which comprises
   (a) a feed station for feeding wafer blocks to a first one of the successively arranged accumulator units and means associated with the feed station for stacking the wafer blocks in the first accumulator unit in a single stack of superposed ones of said wafer blocks,
   (b) conveyance means for conveying the single stack of superposed wafer blocks from the first accumulator unit to the successively arranged accumulator units including a last one of the accumulator units, the conveyance means comprising
      (1) a single horizontal conveyor on each accumulator unit, the horizontal conveyor having a support surface extending in a stationary conveyance plane and supporting the single stack of superposed wafer blocks for conveying the stack from unit to unit,
      (2) adjoining ones of the accumulator units being so arranged that the stationary conveyance planes of the support surfaces define a common plane and facing ends of the horizontal conveyors are close enough for transfer of the stack of superposed wafer blocks from each unit to the adjoining unit, and
   (c) a delivery station receiving the wafer blocks from the last accumulator unit and means associated with the delivery station for singling the wafer blocks.

2. The apparatus of claim 1, wherein the stacking means associated with the feed station is an automatic manipulator.

3. The apparatus of claim 1, wherein the singling means associated with the delivery station is an automatic manipulator.

4. The apparatus of claim 1, wherein the stacking means is integrated in the first accumulator unit.

5. The apparatus of claim 1, comprising at least two sections deviating into different conveyance directions, each section comprising a plurality of the successively arranged accumulator units, and a respective transfer device arranged between said sections for transferring each wafer block stack in a predetermined orientation between a last one of the accumulator units of one of the sections to a first one of the accumulator units of an adjoining section.

6. The apparatus of claim 5, wherein the sections are arranged on at least two superposed levels.

7. The apparatus of claim 6, wherein the transfer device comprises a vertical conveyor constituted by one of the accumulator units movable between the levels.

8. The apparatus of claim 5, wherein the transfer device is an automatic manipulator.

9. The apparatus of claim 1, wherein at least one of the accumulator units comprises a device for compressing the stack of superposed wafer blocks supported on the support surface of the horizontal conveyor thereof.

10. The apparatus of claim 1, further comprising a heat-insulating enclosure for the successively arranged accumulator units.

11. The apparatus of claim 1, further comprising a common enclosure for the successively arranged accumulator units, the common enclosure defining a humidity- and temperature-controlled space.

* * * * *